United States Patent [19]

Tobias

[11] Patent Number: 4,512,662

[45] Date of Patent: Apr. 23, 1985

[54] PLATE SCANNER FOR PRINTING PLATES

[76] Inventor: Philip E. Tobias, 1872 Watson Rd., Abington, Pa. 19001

[21] Appl. No.: 281,226

[22] Filed: Jul. 6, 1981

[51] Int. Cl.³ .............................................. G01B 11/28

[52] U.S. Cl. ...................................... 356/380; 356/429

[58] Field of Search ............... 356/379, 380, 444, 430, 356/429; 250/559

[56] References Cited

U.S. PATENT DOCUMENTS

| | | | |
|---|---|---|---|
| 2,346,031 | 4/1944 | Jones et al. | 356/380 |
| 2,892,951 | 6/1959 | Linderman | 356/430 |
| 3,853,409 | 12/1974 | Gaillochet | 356/432 |
| 3,995,958 | 12/1976 | Pfahl et al. | 356/425 |
| 4,180,741 | 12/1979 | Palmatier et al. | 356/444 |
| 4,289,405 | 9/1981 | Tobias | 356/407 |

FOREIGN PATENT DOCUMENTS

| | | | |
|---|---|---|---|
| 2234818 | 1/1973 | Fed. Rep. of Germany | 356/430 |
| 56-54310 | 5/1981 | Japan | 356/380 |
| 1421550 | 1/1974 | United Kingdom | 356/380 |

*Primary Examiner*—R. A. Rosenberger

*Attorney, Agent, or Firm*—William E. Cleaver

[57] ABSTRACT

The present invention is an arrangement and a method to scan a printing plate and determine the ratio of areas which will carry ink, during a printing process, to areas which will not carry ink, during a printing process, so that adjusting means, at the various stations along an ink reservoir, can be properly set to effect correct ink flows at those various stations.

1 Claim, 4 Drawing Figures

PLATE SCANNER FOR PRINTING PLATES

BACKGROUND

In accordance with the present state of the printing art, a printing press has one or more ink reservoirs and there is a plurality of adjusting screws disposed along the outlet section of each reservoir. The screws may be adjusted to permit more or less ink flow from the position of the reservoir that the screw controls. It is important that the ink flow be as correct as possible. A color as it appears to the human eye is dependent upon the depth of the ink supplied or transferred to the paper or webbing that the person is viewing. If the ink flow is too little then the amount of ink applied to the image areas of the printing plate (which represent the image to be printed) will be insufficient. Therefore when said ink is transferred to the paper, the ink density will be inadequate and the image on the paper will not appear to be of the color desired by the user. Likewise if the ink flow is too great, the amount of transferred ink will be excessive and the ink density too great to provide the proper color to the viewer.

Currently an operator of a printing press, employing prior art techniques and equipment, examines the printing plate and makes a value judgment, based on experience, as to what the settings of the ink flow keys or adjustment screws should be. By eye he attempts to estimate the amount of printing area on the printing plate which lies along a zone, or in line, opposite an associated ink adjustment screw. Since printing areas may consist of solids, halftones, type and discontinuous patterns, such an empirical value judgement is usually extremely inaccurate even with highly experienced operators. Nonetheless in the present state of the art he then sets the screws at the values his experience dictates and he makes a "run" of material, i.e. paper or webbing, upon which he prints images in order to check the colors. Printing presses very often run at speeds of 1500 feet per minute or higher. As can be readily understood, in the current state of the art, very often a number of "makeready" runs are necessary so that repeated adjustments of the keys or adjustment screws can be made in order to obtain the desired colors of the images. Such repeated "makeready" runs represent a great waste of paper and of course a great waste of time. Heretofore there has been little basis, other than empirical, for setting the keys or adjustment screws of the printing press, and even the empirical basis relied on a series of trial and error runs during the "makeready" period. It should also be understood that in an empirical technique for setting the ink feed screws on a press, any adjustment requires a large number of impressions before a new equilibrium point is reached and the adjustment can be evaluated. The foregoing is caused by the reservoir of ink in the roller train being fed by the ink fountain systems.

The present invention enables the printing press operator to electronically scan the printing plate in order to determine the ratio of printing area to nonprinting area along every zone of the printing plate which is controlled by an adjustment screw. The adjustment screws can then be set to control the rate of ink flow along those zones or tracks of the printing plate.

SUMMARY

The present inventive system provides a reading head which includes a plurality of light sensitive diodes disposed in a movable housing. The system further includes a means to hold a printing plate and means to move the reading head across the printing plate. Further, the diodes, in the housing means, are connected to logic circuitry which operates to first read a standard reflectivity value for the area of the plate upon which the operator intends to deposit ink hereinafter called the printing area, and secondly reads a standard reflectivity value for the nonprinting area of the printing plate. Thereafter along each of a plurality of tracks (each track defined by the path of a diode or by an extension of a path from the position of an adjustment screw controlling ink flow from the reservoir) the system reads or detects the total printing area as compared to the total nonprinting area, and makes certain calculations in view of that detected information to determine the percentage, or fraction, along each track that represents printing area requiring ink. These fraction or percentage values are recorded and made available to the operator by virtue of a printout or video display and the operator uses the determined fractions, percentages or functions thereof to set the adjustment screws.

The objects and features of the present invention will be better understood in accordance with the discussion to follow taken in conjunction with the drawings wherein.

Figure 1:
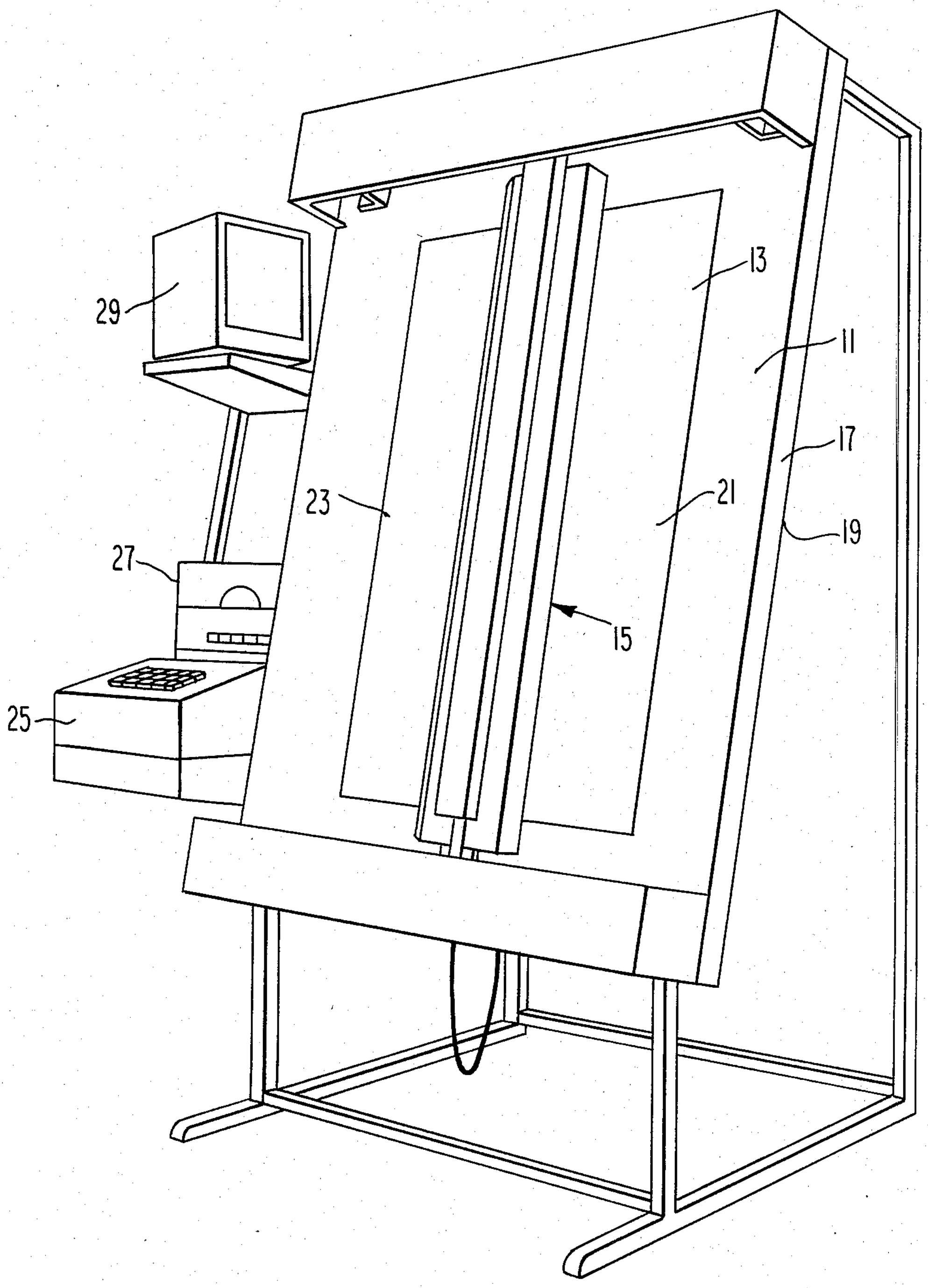
FIG. 1 is a pictorial display showing the mounting board holding the printing plate, the movable housing, the keyboard input, the printout device, and the video display.

Consider FIG. 1. In FIG. 1 there is shown a mounting board 11 upon which a printing plate 13 is held in order that the read head 15 can scan the printing plate. The printing plate 13 can be held by prelocating certain screws, or studs, over which the plate can be mounted. In addition, as in the preferred embodiment, the plate is held against the mounting board 11 by virtue of effecting a vacuum in the chamber 17 between the mounting board 11 and the bottom board 19. In the preferred embodiment there is a plurality of holes in the mounting board 11 under the printing plate position and a vacuum is effected in the chamber 17 to hold the plates firmly against the mounting board 11. Any suitable means for effecting a vacuum may be employed. In the preferred embodiment, the chamber 17 is a high sealed chamber, except for the above described holes, and a volume vacuum pump manufactured by the Hoover Company is fitted onto the mounting board assembly, connected electrically and operated to continually evacuate chamber 17. Even with the vacuum technique, the plate is mounted on studs 21 and 23 in order that it is held in a proper position under the tracks of the diodes.

Further as can be seen in FIG. 1 there is a keyboard 25 which is used to enter certain information into the logic circuitry not shown and there is a printout device 27 from whence the printing press operator can obtain, by virtue of a printout, certain values of available printing area if he so chooses. In addition the printing press operator can get a video display by virtue of the video display device 29 or he can have either the video display or the printout depending upon the model of the system chosen. In the preferred embodiment the printout device is a printer manufactured by Centronics Company and the video display is a CRT monitor manufactured by the Sanyo Company although other suitable printout devices and video displays can be used.

Figure 2:
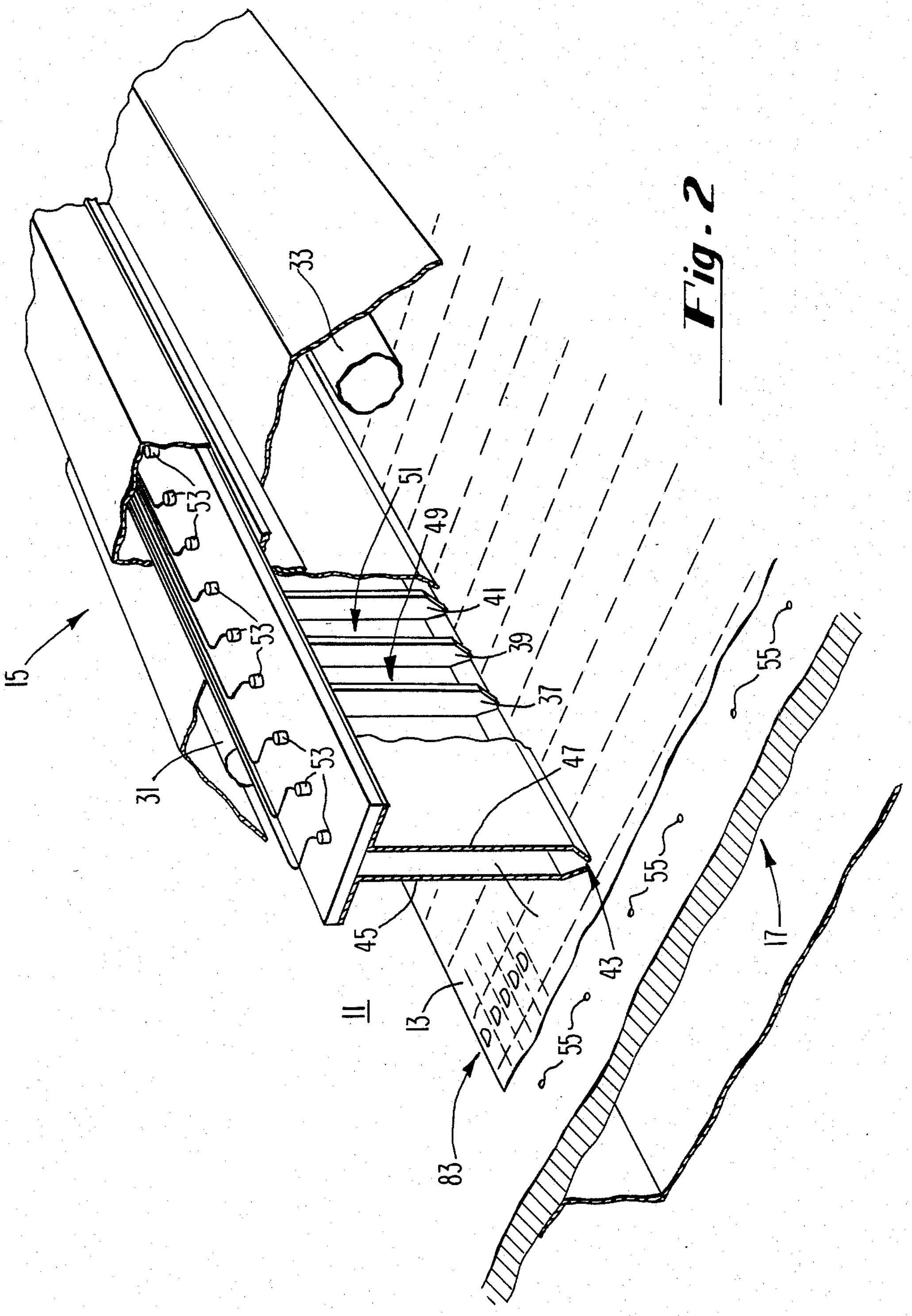
FIG. 2 is an enlarged cutaway of the housing.

Consider FIG. 2 which shows the housing 15 with the covers cut away. As can be seen in FIG. 2 there are two lighting lamps 31 and 33 mounted on either side of a light channel means 35. Light channel means 35 is broken up into a series of segments by virtue of separators (and defined by the space there between) similar to the separators 37, 39 and 41 shown in FIG. 2. Light from the lamps 33 and 31 reflects off the plate 13 and enters the light channel 35 through the opening 43, which opening extends along the length of a housing 15 or more particularly along the lengths of the two plates 45 and 47. The light diffusely reflecting off the plate 13 passes up through each of the segments, such as the segments 49 and 51 shown in FIG. 2, and strikes the associated diode whose upper portion 53 is shown in FIG. 2.

It should be understood that a diode 53 is placed at a predetermined distance from the plate depending on the width of the segment 49 (or 51 or other segments not shown). The predetermined distance is determined by first deciding upon an acceptable error as related to the reception of the reflected light. By employing the cosine square law, it was determined that for the preferred embodiment, if the segment through which the light passed (segments 49 and 51 and the like) were 30.5 millimeters then the predetermined distance (from the plate to the diode) would be 5.5 inches, if the acceptable error were to be 1.2%. Other distances from the plate would be required for different segment widths and different acceptable errors. Nonetheless it is important in the present system that the diodes be located at a distance from the plate to give an acceptable error and an acceptable signal to noise ratio.

Now it should be further understood that normally when a printing plate is formed the printing area will be made of a material which has less reflectivity than the background area or nonprinting areas. For instance very often the printing area is made of a colored light hardened coating while the background or nonprinting area is made of aluminum. The color of the image area of the plate, resulting from the fabrication of the plate, is in no way related to the color of the ink to be printed. Such image area color enables the platemaker to evaluate the image during the making of the plate. It should also be understood that the foregoing reflectivity relationship need not be the case and the present system, with slight adjustment, would still work effectively. However in the course of this discussion we will be considering that the printing area of the printing plate does have a lower reflectivity of light than does the nonprinting area.

Further as can be gleaned from examining FIG. 2 there are holes 55 in the mounting plate 11 which holes, pass into the vacuum manifold 17. When a vacuum is effected in the chamber 17, the printing plate 13 is pulled very securely against the mounting plate 11. It should also be noted in FIG. 2 that in a very exaggerated form there are shown tracks called key zohes which represent the zones of the printing plate along which a diode and segment travel while measuring the combined reflectivity of the printing and nonprinting areas for each such key zone. In the preferred embodiment the opening 43 is ⅛ of an inch and as mentioned earlier the width of the segment is 30.5 millimeters. If a viewer were viewing a plate, for a four color printing arrangement, he might well see a plurality of "dots", possibly different sized "dots" and nonprinting areas between the "dots". Hence light being reflected from the plate through a chamber or segment to a diode is light being reflected from both printing areas (dots) and nonprinting areas at the same time.

Figure 3:
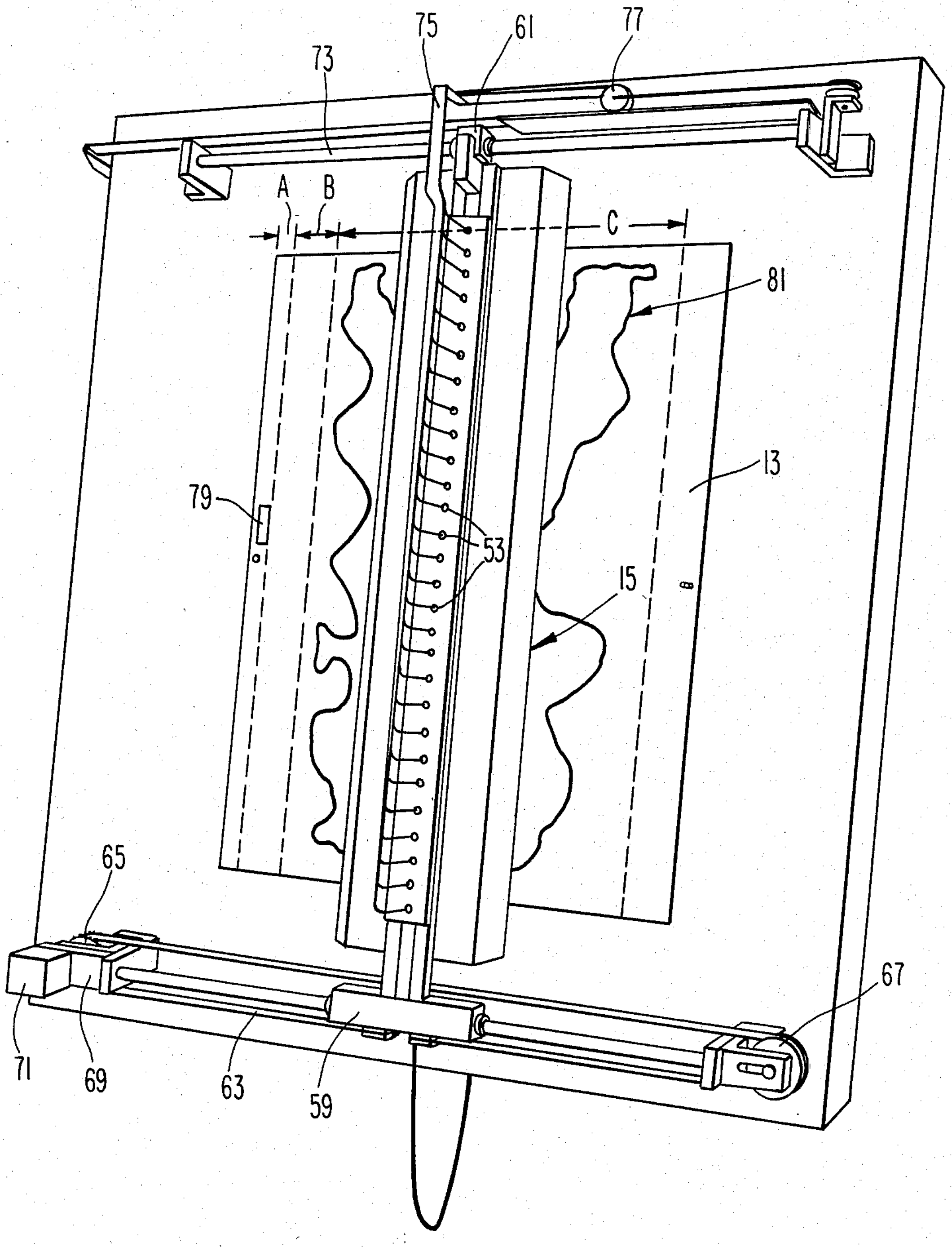
FIG. 3 shows the movable housing and the means for moving the movable housing.

Consider now FIG. 3 which is similar to FIG. 1 except that the top cover has been removed exposing the upper portions of the diodes 53 and the upper cover and lower cover which are held over the driving mechanism, for moving the reading head, have been removed. In FIG. 3, we find that the driving head is coupled to a shuttle means 59 and an upper guide means 61. The shuttle means 59 is coupled to a metallic tape 63, which metallic tape is mechanically linked by virtue of a sprocket or other means to a drive pulley 65. The tape 63 also passes around an idler pulley 67. The drive pulley 65 is coupled, through the gear box 69, to a drive motor 71. Drive motor 71, in the preferred embodiment, is a gear drive motor manufactured by Dayton Company and is capable of being driven in both the clockwise and counter clockwise directions so that the reading head 15 can be moved from left to right and right to left across the printing plate 13. The guide 61 merely rides on a bar 73. However it should be noted that there is a cable holder 75 connected to a spring loaded spool 77 which provides the electrical connection for the movable reading head to the circuitry means described hereinafter.

When the reading head 15 is in its most left hand position or its home position and a scan command is entered through the keyboard, a signal is received by the motor 71 to rotate the drive pulley 65 counter clockwise thereby causing the reading head 15 to move from left to right. Initially as the reading head moves from left to right, it passes across region A, depicted in FIG. 3 on the top portion or gripper edge of the plate 13. As can be gleaned from FIG. 3, in region A, there is a solid strip of image material 79 (often referred to as the test patch) provided by the manufacturer of the plate 13 as a basis of reference for the reflectivity of the printing area. For example, if the printing plate is made by etching away copper from an aluminum base, then the strip 79 would be copper which was not etched away but which remains on the plate for use as image reference in the present system. For this last mentioned example of copper image on aluminum non image, it is preferred that the scan be made prior to the removal of the colored resist on the copper image. The greater the contrast between image and non image, the greater the precision and accuracy of this measurement. The system detects the reflectivity of the printing area as it passes over the strip 79 and records that reflectivity in a memory section of the logic circuitry to be described hereinafter. Thereafter the reading head 15 is moved by virtue of the mechanical linkage tied to the shuttle 59, across the region B, also shown at the top of the plate 13 in FIG. 3. Region B is beyond the active printing area of the plate and normally all of the printing area has been removed, i.e. all of the copper has been etched away in the plate under discussion. Therefore region B is composed of background material. The system detects the background reflectivity for every track or key zone as set out in FIG. 2 along which an associated diode is traveling. The circuitry enables the diodes to be individually read and the respective values recorded along with the identification of which track is being read.

Following the passing of the reading head 15 over the regions A and B, the reading head commences to pass over region C. In region C all of the image to be printed is found. In FIG. 3 there is shown a very irregularly shaped printing area 81 and it is shown in this form for illustrative purposes in describing this invention. It can be envisioned that the printing area 81 is one of the color printers of a map, which is going to be printed under a four color scheme, to show the lowlands in green and the mountains in yellow and various combinations in between. As each of the diodes 53 passes over the image 81 it will read an integrated reflectivity combining contributions from the printing areas and the nonprinting areas. For any given key zone, the values for the average reflectivity will electronically be entered into the equation $C=(I_B-I_X)/(I_B-I_A)$. In this equation, C equals the fraction (or percentage when multiplied by 100) of printing area which needs to be covered by ink. $I_B$ equals the reference background reflectivity, $I_A$ equals the reference image reflectivity corrected for the light intensity at that zone and $I_X$ is the unknown which is determined by a scan along the key zone. In order to correct $I_A$ for the light intensity of a zone under consideration, the test patch $I_A$ value is multiplied by the ratio of $I_B$ of the diode number being considered to the $I_B$ for the diode corresponding to the test patch in region A. This corrected $I_A$ is used in the equation C. When the description refers to $I_B$ as the reference background reflectivity, it is the reflectivity determined by each diode of the reading head, (when it passed across region B), for its associated track. In like manner $I_A$ is derived from the the reflectivity determined by the system when it passed across region A and in particular across the printing area strip 79 as read by the appropriate diode. Accordingly the determination of $I_X$ is made by not only determining the changing reflectivity along the track, be it high or low, depending upon whether it is passing over any combination of printing and nonprinting areas, but indeed the zone is conceptually sliced up into a plurality of segments, or chambers, measured along the vertical distance of the plate and depicted as D segments, along the key zone 83 in FIG. 2. It should be understood that while only five D segments are shown in FIG. 2, the D segments are conceptually considered to continue for each of the key zones for the entire excursion across the printing plate. The spacing of each D segment is determined by a shaft encoder on the motor armature 71 which transmits the position of the reading head. It should be noted that between sampling signals, that is between the D positions, there will be 25 shaft encoder pulses and that will represent approximately ⅛ of an inch of travel of the read head. The foregoing would be dictated by the slot width 43 in FIG. 2, which is ⅛ of an inch in the preferred embodiment. The present system contemplates that for a printing plate which has an image area of forty-five inches around the cylinder of the press, there will be 360 samples taken along each key zone, for the C zone shown in FIG. 3. Thus each D segment will neither overlap nor be separated from the adjoining D segments.

As the reading head 15 traverses the printing plate, the diodes are respectively looking at the light reflected from the lamps 31 and 33 by the plate. The output signals from the respective diodes are serially sampled by electronic circuitry responding to instructions from the program via the ROM and microprocessor. It is only the analog signal from each diode at some instance in time, as it passes over each D segment, that represents the reflectivity of the printing plate under that D segment. It should be further understood that each diode will be recording high, low and intermediate reflectivities as it passes along its associated key zone and each of these analog signals is digitized and added to the summation of the reflectivity values seen by the light sensitive diodes. At the end of an excursion the summation is divided by the number of D segments or scans and that arithmetic operation provides an average $I_X$ which is eventually employed in the equation above. The "C" equation is solved by the system circuitry and accordingly for each key zone there is provided a fraction, converted to a percentage, of printing required for that key zone.

Figure 4:
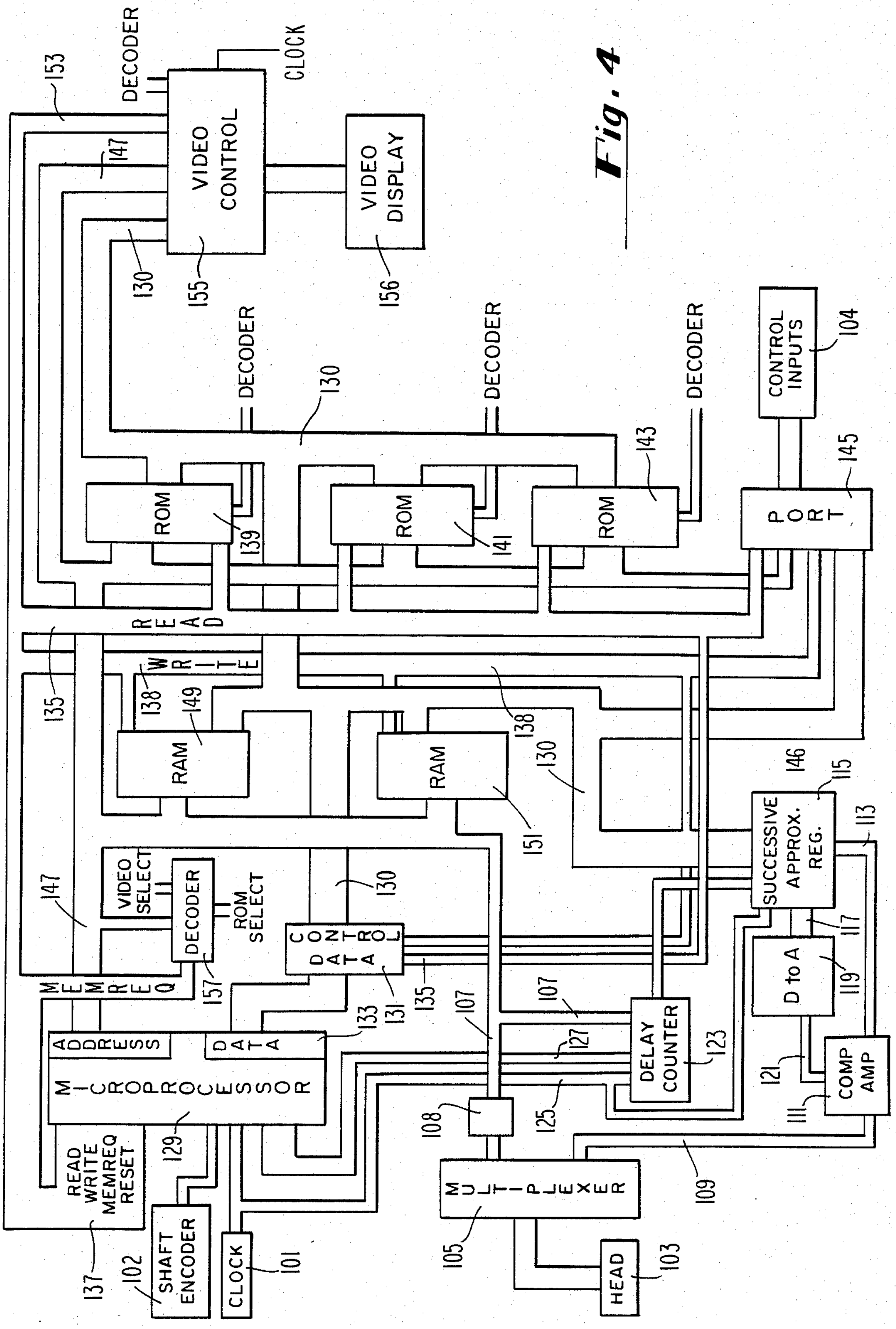
FIG. 4 is a block diagram of the circuitry involved to effect the determination of the percentages of printing area available along each track.

Consider now FIG. 4 which is a block diagram of the overall circuitry system. In FIG. 4 there is shown a read head 103 which was described in connection with the description of FIGS. 1, 2 and 3. It should be noted that in the preferred embodiment the read head 103 has 36 light sensitive diodes and therefore reads 36 channels or 36 key zones as it scans the printing plate. There could be more or less channels (and diodes) than 36 depending upon the size of the printing plate and depending upon the number and spacing of keys or adjustment screws for the ink reservoir of the press to be used. The diodes are connected in four groups of eight (respectively) multiplexer circuit boards and the remaining four diodes are connected into a fifth multiplexer circuit board. The five multiplexer circuit boards are connected into a master multiplexer circuit board. Connected to the first set of five multiplexer circuit boards is a common address channel from the microprocessor 129 shown in FIG. 4 as channel 107. To the master multiplexer circuit board there is also an address channel, again included as part of channel 107, to select the proper one of the five multiplexer circuit boards. In other words by incrementing the address counter counter or address source in the microprocessor, each channel of similar location is activated and then through serially addressing the master multiplexer circuit board each of five multiplexer circuit cards is activated serially so that all 36 diodes or 36 channels are interrogated. Obviously other forms of addressing could be arranged. When we discuss the multiplexer means 105 in FIG. 4 we will have to understand that within that multiplexer means there are at least six multiplexer circuit boards in the preferred embodiment, four dedicated to each having eight channels or lights sensitive diodes connected thereto, while one has four diodes connected thereto and one dedicated to selecting which one of five boards boards should be interrogated. The multiplexer boards in multiplexer 105 means in the preferred embodiment employs chips designated as CB 4051AE which are manufactured by the RCA Corporation. It should be understood that other types of multiplexer (elements or system) could be used.

As was just mentioned the multiplexer means 105 is activated by address signals, from the microprocessor 129, which address signals are transmitted on the address line 107. In response to the address signals present on the address line 107, the multiplexer means 105 serially passes the analog signals from the diodes along the channel 109 to the comparator amplifier device 111. The comparator amplifier device 111 is circuitry composed of an operational amplifier whose output is fed into one leg of a 111 comparator. The output from the comparator is transmitted along the line 113 to the successive approximation register 115. The successive approximation register 115, in the preferred embodiment, is manufactured by the National Semiconductor Corporation and is designated as DM2502C. It should be understood that other types of successive approximation registers could be used. The successive approximation register (hereinafter SAR) in an orderly fashion develops a digital output signal, through a loop including a D/A converter 119 and a comparator 111 which digital signal is a digitization of the analog input signal to the comparator. The digital to analog converter 119 (hereinafter DA 119) in the preferred embodiment is manufactured by the Motorola Company and is designated as an MC1408L8, but it should be understood that a similar D/A converter could be used. From D/A 119 there is a feedback circuit on line 121 which transmits the analog signal back to the comparator amplifier 111. When the analog signal on line 109 is equal to the analog signal on line 121, there ceases to be any further input on line 113 into SAR 115 and hence the analog signal representing the value of the reflectivity of the D segment, in the particular key zone being scanned by the head, is digitized. When the system is in a scan operation and therefore the system must operate to accept readings from the read head, there is a command transmitted to the delay counter 123 along the address signal lines 107. In addition, there is a clock signal transmitted on line 125 as well as a further control signal on line 127 from the microprocessor 129 in order to initiate the operation of the delay counter. The function of the delay counter 123 is to cause the microprocessor 129 to wait, or delay its operation, until the signals from the head 105 have "settled down". Also in the preferred embodiment there has been added a latch 108. The latch 108 can be an input/output port manufactured by Intel Corporation and designated as an 8212. The role of a latch 108 is to keep the multiplexer means 105 addressed for a relatively long period of time for example twelve microseconds so that signals in the digital to analog and analog to digital loop settle down. In the preferred embodiment, the scanning head actually looks at some form of black plastic even before the zone A is approached in order that the circuitry and particularly the analog to digital circuitry will have a reference zero or no light voltage level to correct any drifts that might exist, when the system starts looking at the reflectivity values in zones A, B, and C. While this is a desirable aspect it is not essential to practicing the present invention.

The signals from the read head 103, which have been digitized at the SAR 115, are transmitted on the data line 130, through the data control device 131 into the data entry section 133 of the microprocessor 129. At this time, there will be a read command control signal transmitted to the data control device 131 along the read control signal line 135. The read command signal conditions a solid state switch within the data control device 131 to pass data signals into the microprocessor 129. This read command signal comes from the microprocessor 129 on channel 137, and is also transmitted along the lines 135 to ROMS 139, 141, and 143 as well as to the port device 145. The data control device 131 is an integrated circuit that includes a plurality of controllable solid state switches that permit two way data traffic. In the preferred embodiment the data control device 131 is an integrated circuit manufactured by National Semiconductor Corporation and designated 81LS95. The ROMS 139, 141 and 143 are read only memories manufactured by the Intel Corporation and each is designated as a 2708 device. Obviously, other forms of read only memory devices (ROMs) could be used. The port device 145 mentioned earlier, is an integrated circuit manufactured by Intel Corporation and is designated as 8255A and obviously other forms of port devices could be used. The microprocessor device 129, described above, in the preferred embodiment is manufactured by Mostek Company and is designated as MK3880.

The clock 101 represents a crystal controlled clock, while shaft encoder 102 provides a form of clock signal which is generated by the rotation of the shaft of the motor 71 shown in FIG. 3. The signals generated from the rotation of the shaft of the motor 71 provide a basis for measuring distance as the head 15 moves from left to right and it is these shaft encoder signals that provide the sampling signals to have the system look at all the D segments which were discussed in connection with FIG. 2.

The program counter within the microprocessor is advanced by clock pulses from 0 through a number of steps and the instructions generated in response thereto accomplish a number of "housekeeping" matters. After the "housekeeping" is completed, the program counter reaches a point where the program calls for input from the keyboard (included in control input means 104) which will initiate the subroutines of storing the reflectivity of the patch strip 79, storing the reflectivities of each of the key zones along region B, discussed with respect to FIG. 3, and storing the reflectivity values for each of the key zones along region C as well as making a summation of those reflectivity values and eventually going into the subroutine mentioned earlier of calculating the "C" values and other derived values as earlier described.

When the system first commences to operate and the scan head is passed over the print area reference strip (such as the reference strip 79 shown in FIG. 3 and discussed earlier) the reflectivity value is converted into a digitized value as just described and is transmitted on line 130 through the data control device 131 into the microprocessor. Immediately thereafter the microprocessor provides address data to RAM 149 and transmits the data back along 130, through the data control device 131 to the data entry of RAM 149, and into the memory locations selected by the address data. Thereafter that reference reflectivity data is available for computation in the equation discussed earlier. In like manner when the read head 103 passes over region B shown in FIG. 3 each of the diodes is interrogated by incrementing a port address counter, thereby generating sequential addresses in the microprocessor 129. Accordingly each of the analog signals from each of the diodes is digitized in the SAR 115 as previously described and transmitted along line 130 into the microprocessor 129 and then retransmitted from the microprocessor 129 through the data control device 131 to RAM 149 and RAM 151. RAMs 149 and 151 in the preferred embodiment are coupled to each hold a portion of a word at a given address so that together they hold completely such a word and of course they actually hold a plurality of words. A single RAM could be used. In order for the data to be entered into the RAMs 149 and 151 there is a write command signal transmitted from channel 137, along lines 138 to condition RAMs 149 and 151 to have data information written thereinto.

It follows then that after the read head 103 (or read head 15 in FIGS. 1, 2 and 3) passes over the regions A and B shown in FIG. 3, the system has recorded $I_A$ and a plurality of $I_B$ signals for use in solving the "C" equation for each of the key zones being scanned. As the read head 103 commences to scan region C, as shown in FIG. 3, the multiplexer means 105 is subjected to a series of address signals selecting each of the diodes 53 and the multiplexer means 105 enables the analog signals from each of those diodes to be digitized at the SAR 115 as described earlier. These digitized signals are transmitted along line 130, through the data control device 131 into the microprocessor 129. It should be understood that each of the diodes and correspondingly each of the key zones has a portion of the RAMs 149 and 151 designated as the memory location for the information coming from that channel. Accordingly when the address signals from the microprocessor 129 are transmitted on line 107 to the multiplexer means 105 to select the proper channel, those address signals or other address signals are transmitted to RAMs 149 and 151 and cause the data stored at those locations to be transmitted on lines 130 through the data control device 131 into the microprocessor 129 to await the digitized value of the reflectivity being read during the time period in which the address signals have been generated. The address signals condition the address selected memory locations so that in response to a concurrent "high" write signal on line 138 the information at the proper address, from RAMs 149 and 151, is entered into the data processor to await the digitized value of the reflectivity being sampled at that time. When the digitized value from SAR 115 arrives at the microprocessor 129 as previously described, it is arithmetically summed with the data which was just fetched from the address location assigned to that particular diode channel. Then the information is returned, through the data control device 131, along line 130 to the RAMs 149 and 151 and written or entered into the same address location, in response to a "low" write signal transmitted along lines 137 and 138 to the RAMs. This process continues with the microprocessor keeping account of all of the sampling clock pulses until the read head 15, as shown in FIG. 3, reaches the end of its excursion and trips a mechanical switch or interrupts a light beam, indicating that it has completed a physical scan of the printing plate 13. It should be noted that in the preferred embodiment the RAMs 149 and 151 respond to a "low" write signal for writing information into the RAM and respond to a "high" write signal for reading information from the RAM. Other forms of read and write command signals could be used. It should also be noted that the ROMs 139, 141 and 143 contain all of the internal instructions to have the microprocessor operate in whatever routine it should operate as well as the instructions to the video control device and printer device to effect the corresponding output forms. The operation of the ROM memories 139, 141 and 143 in response to address signals being transmitted thereto (on the left hand side) and the data signals being transmitted therefrom (on the right hand side), is obvious to anyone skilled in the art and no further explanation thereof is deemed necessary. There is shown in FIG. 4 a decoder 157 which has an output to the video select and to the ROM select. The decoder 157 is a means which takes a portion of the output from the address circuitry and provides signals to select a particular ROM and provides a control signal for the video circuitry.

It should be understood that the system could count shaft encoder pulses and when such pulses get to a predetermined number the system would know that the physical scan had been finished and could then go to the next routine. In the preferred embodiment the microprocessor is programmed to look for a data value from port means 145 which indicates that the mechanical interrupt or flag has been generated. The flag signal will come to the port 145 and will generate a set of data signals on the lines 146 which signals are further transmitted along the channel 130 to the data control device 131, through the data control device, into the microprocessor 129 whereat the value is compared with information taken from one of the ROMs 139, 141 and 143 and when the comparison indicates a match, the microprocessor 129 goes into a subroutine to be described hereinafter.

When the end of the excursion has been detected and the microprocessor 129 goes into a new subroutine, that subroutine causes the total reflectivity value (summation of the digitized data mentioned earlier) for each of the key zones to be serially fetched from the proper addresses in the RAMs 149 and 151. For each key zone total reflectivity value, there is a division by the number of samples, to provide an average reflectivity value, thereby determining the $I_X$ for the particular key zone. These average $I_X$ values are returned to the RAMs, after they have been calculated, to await the second step of the subroutine. In the second step of the subroutine, these $I_X$ values are fetched and inserted into the equation $C=(I_B-I_X)/(I_B-I_A)$.

When each of the "C" values is determined it is returned to the proper address location in the RAMs. Accordingly as the read head 15 is moved to the left or its home position the calculations described above are made.

Thereafter the user of the system can instruct the system through the console 148, to fetch the C values from the RAMs along the data lines 130, through the video control device 155 to be shown on the video display 156 so that the user can note what the percentage of printing area is available along any key zone and thereby can have the ink control keys properly adjusted and/or this information can be printed out as a permanent record. It should be noted that the "C" values which were determined could be used along with a servo system to automatically adjust the adjustable screws, thereby controlling the ink flow. It should also be noted that because the C values can be determined, the adjustable screws can be adjusted, without trial and error runs, to take into account the possible transfer of ink from one key zone to another which results because of the lateral movement of the rollers in the system. It is well known that rollers in the printing press do have some lateral movement and therefore ink which might be emanating from a particular key position can actually end up in some portion of a neighboring key zone of a printing plate. If the operator knows beforehand what the available printing area might be with respect to adjacent key zones, then he can properly adjust the keys to compensate for that lateral movement or oscillation and may be assisted in doing so by the computer functions of the present invention.

The detailed description of the block diagram shown in FIG. 4 can be found as part of the description in my U.S. Pat. No. 4,289,405. In that patent description there is a block diagram which is virtually identical to that shown in FIG. 4 and more detailed circuitry diagrams along with a more detailed circuit elements are described in the description section of that patent. In order to simplify the description herein and since the implementation of FIG. 4 need not be the only implementation of the signals generated by the read head and in view of the detailed description in my U.S. Pat. No. 4,289,405, no further detailed description is deemed necessary.

It will be noted in FIG. 4 that the read and write control signals are transmitted along lines 153 to the video control circuitry 155. The address signals from the microprocessor 129, mentioned earlier, are transferred on lines 107 to the video control circuitry 155. The data signals on lines 130 are also transmitted to the video control circuitry 155. It should be understood that any form of circuitry normally used with a video display can be used with the present device and such circuitry is well known to those skilled in the video art and it is deemed that no further description thereof is necessary here. A detailed description of such video control circuitry can be found in the description of my U.S. Pat. No. 4,289,405.

I claim:

1. An arrangement for use with a printing press which has a reservoir means and a plurality of adjustable means, where each adjustable means controls ink flow from said reservoir means onto a different associated zone of a plurality of zones along a printing plate used with said printing press and which arrangement provides information which can be used to determne the amount of printing area in each of said zones comprising in combination: printing area reference means formed integral as part of said printing plate whereby light reflected from a printing area and from said printing area reference means is uniform; non-printing area reference means formed on said printing plate; image area means formed on said printing plate and including printing areas and non-printing areas; holder means formed to hold said printing plate; reading head means including light source means and a plurality of light sensitive diodes, said reading head means formed to include a plurality of walled chambers; each of said walled chambers formed and disposed to define the width of an associated different one of said zones and formed to have an aperture therein lying substantially perpendicular to its associated zone; each of said light sensitive diodes disposed within a different one of said walled chambers to receive reflected light passing through said aperture of said associated walled chamber; said reading head means further formed and disposed to move over said printing area reference means, over said non-printing area reference means and over said image area means such that each of said walled chambers moves parallel to its associated zone and such that said light source means transmits light to said printing plate to effect reflected light therefrom, whereby each of said light sensitive diodes receives reflected light from along a different associated one of said zones to provide electrical signals indicative of the quantity of both printing areas and non-printing areas lying along said different associated one of said zones; means connected to said read head to transmit said electrical signals to data processing circuitry whereby for each of said zones, lying in the image area, the amount of printing area can be determined.

* * * * *